(12) United States Patent
Shinkai et al.

(10) Patent No.: US 11,144,061 B2
(45) Date of Patent: Oct. 12, 2021

(54) WORK VEHICLE AND TIME-BASED MANAGEMENT SYSTEM APPLICABLE TO THE WORK VEHICLE

(71) Applicant: Kubota Corporation, Osaka (JP)

(72) Inventors: Atsushi Shinkai, Sakai (JP); Kotaro Yamaguchi, Amagasaki (JP)

(73) Assignee: Kubota Corporation, Osaka (JP)

( * ) Notice: Subject to any disclaimer, the term of this patent is extended or adjusted under 35 U.S.C. 154(b) by 407 days.

(21) Appl. No.: 16/093,678

(22) PCT Filed: Dec. 6, 2016

(86) PCT No.: PCT/JP2016/086232
§ 371 (c)(1),
(2) Date: Oct. 15, 2018

(87) PCT Pub. No.: WO2017/203733
PCT Pub. Date: Nov. 30, 2017

(65) Prior Publication Data
US 2019/0072972 A1    Mar. 7, 2019

(30) Foreign Application Priority Data

May 26, 2016 (JP) .............................. JP2016-105365

(51) Int. Cl.
*G05D 1/00* (2006.01)
*G05D 1/02* (2020.01)
(Continued)

(52) U.S. Cl.
CPC ......... *G05D 1/0217* (2013.01); *A01B 69/007* (2013.01); *A01B 69/008* (2013.01);
(Continued)

(58) Field of Classification Search
None
See application file for complete search history.

(56) References Cited

U.S. PATENT DOCUMENTS 5,768,810 A * 6/1998 Ahn .................. E02F 3/436
37/348
6,108,949 A * 8/2000 Singh .................. E02F 3/437
37/195
(Continued)

FOREIGN PATENT DOCUMENTS

| JP | 63148909 A | 6/1988 |
|---|---|---|
| JP | 2002358122 A | 12/2002 |

(Continued)

*Primary Examiner* — Jonathan M Dager
(74) *Attorney, Agent, or Firm* — The Webb Law Firm

(57) ABSTRACT

There is a need for a work vehicle that allows accurate traveling time management in a work site traveling. A work vehicle includes a vehicle body mounting a traveling mechanism, an implement mounted on the vehicle body and configured to effect a ground work on a work site, a satellite positioning module 80 for outputting positioning data, a traveling distance calculation section 51 for calculating a traveling distance of the vehicle body based on the positioning data, a traveling time calculation section 52 for calculating an actual distance traveling time from a time required for traveling of traveling distance calculated by the traveling distance calculation section 51 and a work management section 50 for managing the ground work based on the actual distance traveling time.

10 Claims, 5 Drawing Sheets

(51) Int. Cl.
  *E02F 9/20* (2006.01)
  *A01B 69/04* (2006.01)
  *A01B 69/00* (2006.01)
(52) U.S. Cl.
  CPC .............. *E02F 9/20* (2013.01); *E02F 9/2087* (2013.01); *G05D 1/0088* (2013.01); *G05D 1/0219* (2013.01); *G05D 1/0278* (2013.01)

(56) References Cited

U.S. PATENT DOCUMENTS

| | | | | |
|---|---|---|---|---|
| 6,167,336 A * | 12/2000 | Singh | ................ | E02F 3/434 172/2 |
| 6,363,632 B1 * | 4/2002 | Stentz | ................ | E02F 3/437 37/414 |
| 6,823,616 B1 * | 11/2004 | Gutter | ................ | E02F 1/00 294/68.23 |
| 6,901,319 B1 | 5/2005 | Nelson et al. | | |
| 7,627,410 B2 * | 12/2009 | Berry | ................ | E02F 9/2029 701/1 |
| 7,853,382 B2 * | 12/2010 | Anderson | ............ | E02F 9/2253 701/50 |
| 8,364,353 B2 * | 1/2013 | Kiegerl | ................ | E02F 9/205 701/50 |
| 8,838,331 B2 * | 9/2014 | Jensen | ................ | G01N 9/36 701/34.4 |
| 9,206,587 B2 * | 12/2015 | Linstroth | ............ | E02F 9/265 |
| 9,228,321 B1 * | 1/2016 | Stratton | ............ | G05D 1/0022 |
| 9,256,227 B1 * | 2/2016 | Wei | ................ | E02F 9/264 |
| 9,297,147 B1 * | 3/2016 | Wei | ................ | E02F 9/205 |
| 9,360,334 B2 * | 6/2016 | Wei | ................ | E02F 9/205 |
| 9,404,239 B2 * | 8/2016 | Wei | ................ | E02F 9/205 |
| 9,458,598 B2 * | 10/2016 | Takaura | ................ | E02F 3/437 |
| 9,469,967 B2 * | 10/2016 | Edara | ................ | E02F 9/262 |
| 9,605,415 B2 * | 3/2017 | Edara | ................ | E02F 9/2054 |
| 9,760,081 B2 * | 9/2017 | Taylor | ................ | E02F 9/2045 |
| 9,904,963 B2 * | 2/2018 | Rupp | ................ | H04W 4/70 |
| 10,066,367 B1 * | 9/2018 | Wang | ................ | E02F 9/2029 |
| 10,146,220 B2 * | 12/2018 | McHugh | ................ | G05D 1/0038 |
| 10,151,078 B1 * | 12/2018 | Metzger | ................ | E02F 3/845 |
| 10,208,453 B2 * | 2/2019 | Taylor | ................ | E02F 9/262 |
| 10,267,018 B2 * | 4/2019 | Benson | ................ | E02F 9/2066 |
| 10,380,704 B2 * | 8/2019 | Pfeiffer | ................ | G06Q 50/02 |
| 10,407,878 B2 * | 9/2019 | Wei | ................ | E02F 9/264 |
| 10,472,803 B2 * | 11/2019 | Wei | ................ | E02F 3/841 |
| 10,774,506 B2 * | 9/2020 | Wei | ................ | E02F 9/265 |
| 10,794,039 B2 * | 10/2020 | Wei | ................ | E02F 9/205 |
| 10,820,508 B2 * | 11/2020 | Dix | ................ | A01D 57/22 |
| 10,822,771 B2 * | 11/2020 | Ishibashi | ................ | E02F 3/845 |
| 10,832,435 B1 * | 11/2020 | Mathew | ................ | G06K 9/6267 |
| 10,860,016 B1 * | 12/2020 | Wang | ................ | G05D 1/0027 |
| 2003/0019132 A1 * | 1/2003 | Kurenuma | ................ | E02F 9/26 37/348 |
| 2004/0020083 A1 * | 2/2004 | Staub | ................ | E02F 9/26 37/348 |
| 2007/0240341 A1 * | 10/2007 | Hyde | ................ | E02F 3/48 37/398 |
| 2007/0299590 A1 * | 12/2007 | Shull | ................ | E02F 9/26 701/50 |
| 2008/0133128 A1 * | 6/2008 | Koch | ................ | E02F 3/435 37/348 |
| 2008/0282583 A1 * | 11/2008 | Koellner | ................ | E02F 9/264 37/348 |
| 2009/0006540 A1 * | 1/2009 | Liu | ................ | H04L 67/06 709/203 |
| 2010/0223008 A1 * | 9/2010 | Dunbabin | ................ | E02F 9/265 701/301 |
| 2012/0136508 A1 * | 5/2012 | Taylor | ................ | G05D 1/0274 701/2 |
| 2012/0215378 A1 * | 8/2012 | Sprock | ................ | G07C 5/008 701/2 |
| 2012/0239260 A1 * | 9/2012 | Ishikawa | ................ | A01B 63/112 701/50 |
| 2012/0253709 A1 * | 10/2012 | Schmidt | ................ | G07C 5/008 702/60 |
| 2013/0311031 A1 * | 11/2013 | Friend | ................ | E02F 9/2054 701/26 |
| 2014/0012404 A1 * | 1/2014 | Taylor | ................ | G06F 30/13 700/97 |
| 2014/0032132 A1 * | 1/2014 | Stratton | ................ | E02F 9/2029 702/33 |
| 2014/0064897 A1 * | 3/2014 | Montgomery | .......... | E02F 9/262 414/685 |
| 2014/0088838 A1 * | 3/2014 | Furem | ................ | G01G 19/14 701/50 |
| 2014/0174770 A1 * | 6/2014 | Wei | ................ | B60P 1/00 172/2 |
| 2014/0180548 A1 * | 6/2014 | Edara | ................ | G05B 13/024 701/50 |
| 2014/0277905 A1 * | 9/2014 | Anderson | ...... | G06Q 10/063114 701/29.3 |
| 2015/0050110 A1 * | 2/2015 | Matsuyama | ............ | E02F 9/262 414/687 |
| 2015/0134221 A1 * | 5/2015 | Pelletier | ................ | B62D 11/02 701/87 |
| 2015/0234767 A1 * | 8/2015 | Tatge | ................ | G06Q 10/0631 710/306 |
| 2015/0276468 A1 * | 10/2015 | Jaeger | ................ | G01G 19/08 382/154 |
| 2015/0346728 A1 * | 12/2015 | Peake | ................ | G05D 1/0219 701/23 |
| 2016/0040392 A1 * | 2/2016 | Kontz | ................ | E02F 3/84 700/275 |
| 2016/0076222 A1 * | 3/2016 | Taylor | ................ | E02F 9/205 701/50 |
| 2016/0076223 A1 * | 3/2016 | Wei | ................ | E02F 9/205 701/50 |
| 2016/0201298 A1 * | 7/2016 | Taylor | ................ | E02F 3/841 701/50 |
| 2016/0300175 A1 * | 10/2016 | Talmaki | ................ | G06Q 10/06315 |
| 2016/0300195 A1 * | 10/2016 | Harvey | ................ | G06Q 10/20 |
| 2016/0343095 A1 * | 11/2016 | Wei | ................ | G06Q 10/06398 |
| 2017/0002540 A1 * | 1/2017 | Fletcher | ................ | E02F 9/205 |
| 2017/0168501 A1 * | 6/2017 | Ogura | ................ | G05D 1/0038 |
| 2017/0185906 A1 * | 6/2017 | Collins | ................ | G06N 7/005 |
| 2017/0202131 A1 * | 7/2017 | Bunderson | ............ | A01B 79/005 |
| 2017/0247860 A1 * | 8/2017 | Lehtinen | ................ | E02F 9/2029 |
| 2017/0255895 A1 * | 9/2017 | Kozumi | ................ | H04N 7/185 |
| 2017/0308091 A1 * | 10/2017 | Bunderson | ............ | A01B 79/005 |
| 2017/0322550 A1 * | 11/2017 | Yokoyama | ................ | A01B 63/02 |
| 2018/0038068 A1 * | 2/2018 | Hashimoto | ............ | E02F 9/262 |
| 2018/0038069 A1 * | 2/2018 | Hashimoto | ............ | E02F 3/847 |
| 2018/0038070 A1 * | 2/2018 | Hashimoto | ............ | E02F 3/847 |
| 2018/0038082 A1 * | 2/2018 | Hashimoto | ............ | E02F 3/844 |
| 2018/0106709 A1 * | 4/2018 | Cherney | ................ | G01F 22/00 |
| 2018/0210454 A1 * | 7/2018 | Ready-Campbell | ........ | G05D 1/0231 |
| 2018/0281796 A1 * | 10/2018 | Ravichandran | ..... | B60W 30/181 |
| 2018/0319392 A1 * | 11/2018 | Posselius | ................ | E02F 9/24 |
| 2019/0101641 A1 * | 4/2019 | Hogan | ................ | G01S 13/885 |
| 2019/0218745 A1 * | 7/2019 | Hashimoto | .......... | G05D 1/0274 |
| 2019/0226175 A1 * | 7/2019 | Mairet | ................ | E02F 3/3414 |
| 2020/0019192 A1 * | 1/2020 | O'Donnell | ................ | G05D 3/20 |
| 2020/0032490 A1 * | 1/2020 | Ready-Campbell | .... | E02F 9/205 |
| 2020/0041331 A1 * | 2/2020 | Hoshino | ................ | G01G 23/365 |
| 2020/0063395 A1 * | 2/2020 | Ready-Campbell | .... | E02F 3/964 |
| 2020/0087893 A1 * | 3/2020 | Hageman | ................ | E02F 3/32 |
| 2020/0367421 A1 * | 11/2020 | Mola | ................ | G01B 21/28 |

FOREIGN PATENT DOCUMENTS

| | | |
|---|---|---|
| JP | 2003303021 A | 10/2003 |
| JP | 2005315768 A | 11/2005 |
| JP | 2010142185 A | 7/2010 |
| JP | 2010187588 A | 9/2010 |
| JP | 201229600 A | 2/2012 |
| JP | 201519640 A | 2/2015 |
| WO | 2016076289 A1 | 5/2016 |

* cited by examiner

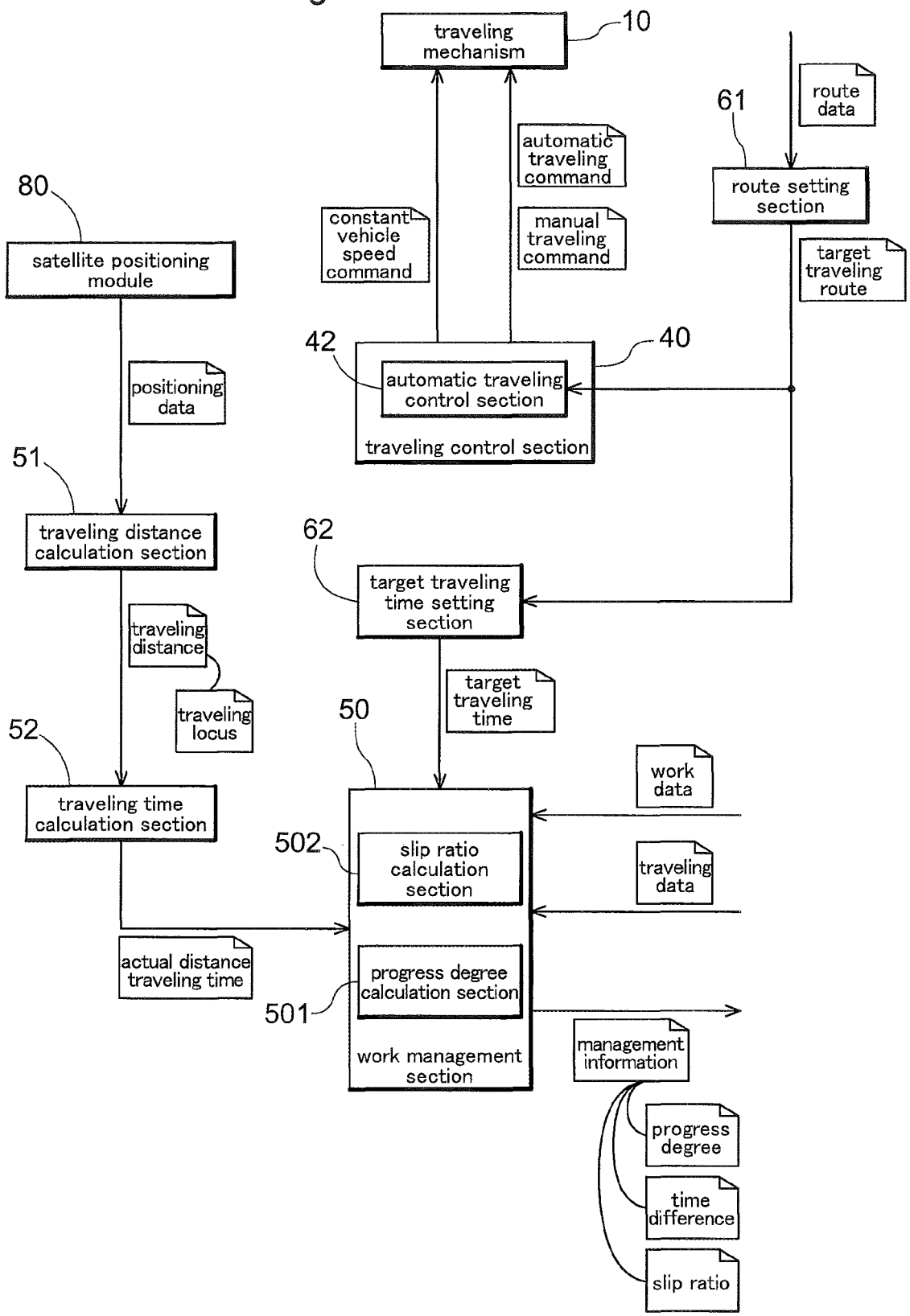

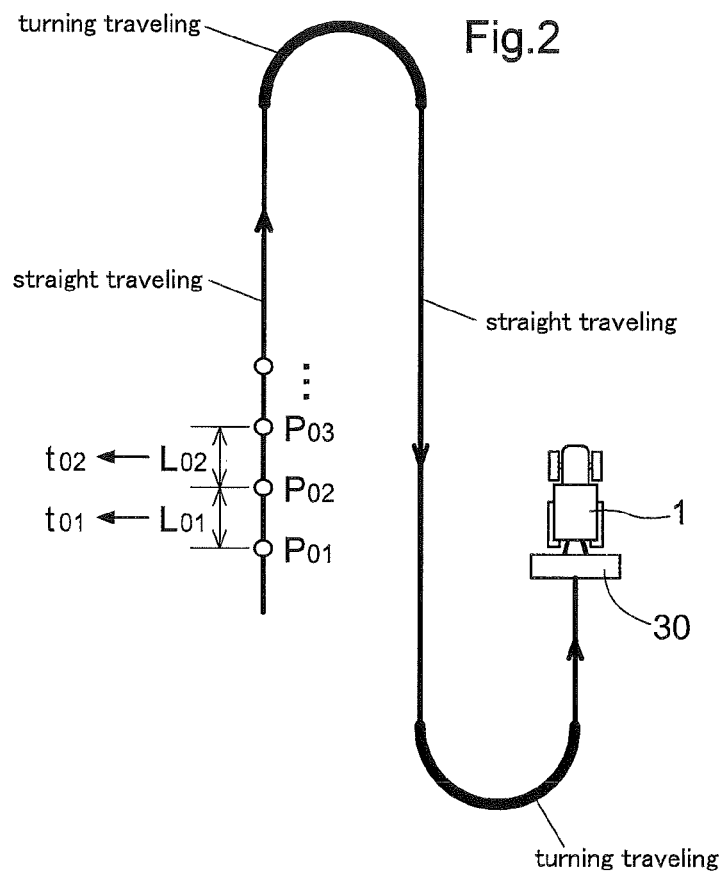
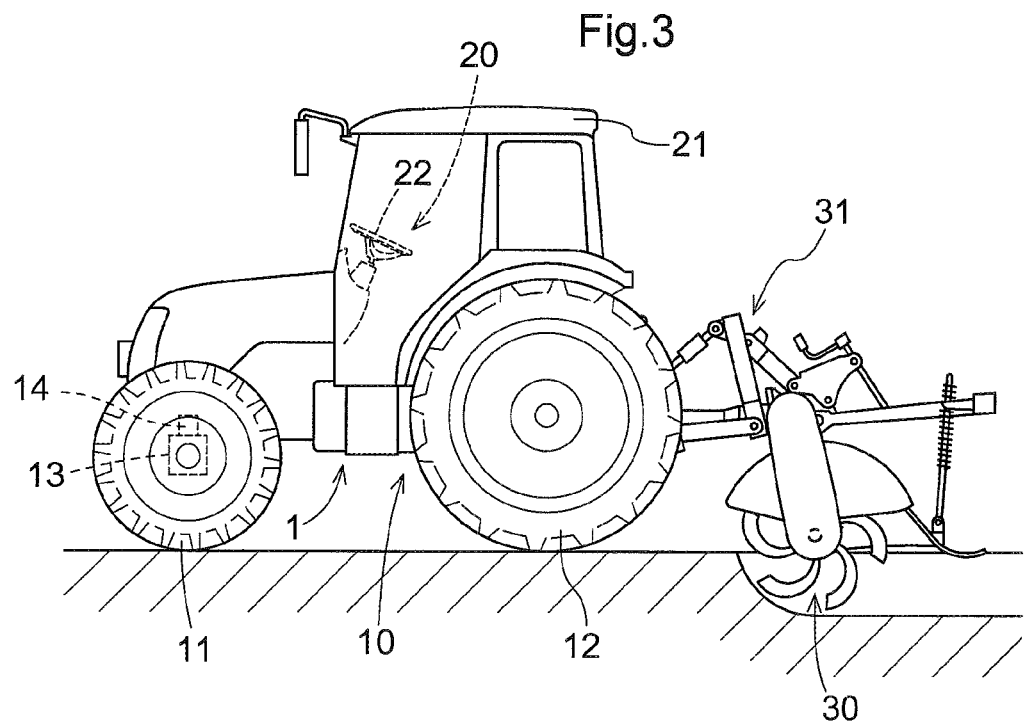

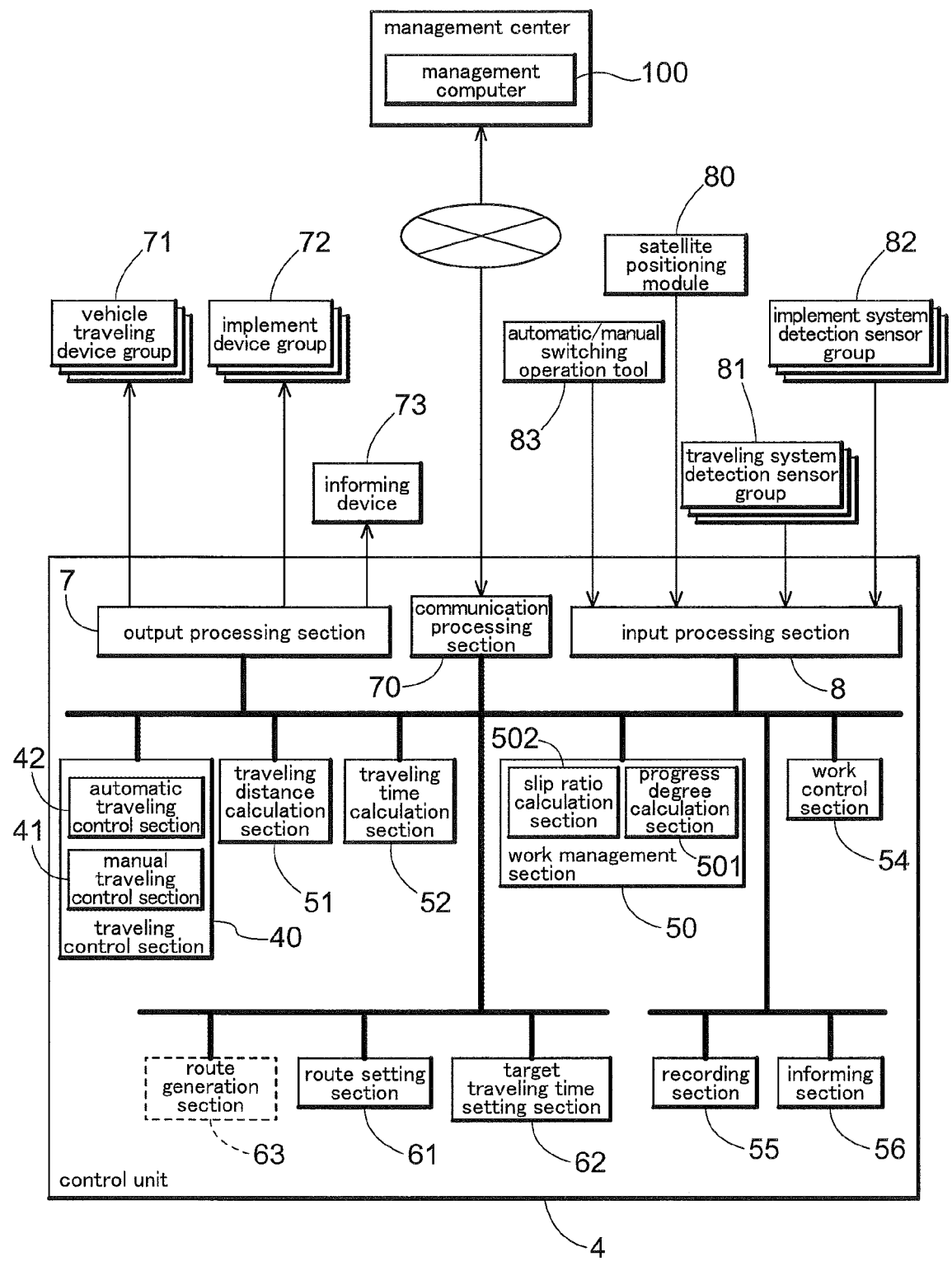

WORK VEHICLE AND TIME-BASED
MANAGEMENT SYSTEM APPLICABLE TO
THE WORK VEHICLE

CROSS-REFERENCE TO RELATED APPLICATIONS

This application is the United States national phase of International Application No. PCT/JP2016/086232 filed Dec. 6, 2016, and claims priority to Japanese Patent Application No. 2016-105365 filed May 26, 2016, the disclosures of which are hereby incorporated in their entirety by reference.

TECHNICAL FIELD

The present invention relates to a work vehicle that effects ground work while traveling in a work site such as a field, a civil engineering work site, etc. The invention relates also to a time-based management system applicable to such work vehicle.

BACKGROUND ART

Patent Document 1 discloses a seedling transplanting machine having a work determination device for determining e.g. a degree of progress in a planting work ongoing in a field while traveling for seedling planting in the field. With this seedling transplanting machine, by using a rotation detection member for detecting a driving rotation of rear wheels, a steering detection member for detecting a steering operation of front wheels, etc., a seedling planting ridge area of a unit seedling planting traveling ridge, a time required for movement of a seedling planting traveling distance in a vertical direction and a time required for a turning distance are determined. With this, it is contemplated to effect a planting work while estimating a progress degree, completion time, remaining area of planting work, etc.

BACKGROUND ART DOCUMENT

Patent Document

Patent Document 1: Japanese Unexamined Patent Application Publication No. 2012-29600

However, in the case of the technique according to Patent Document 1 above in which a vehicle speed is calculated based on a driving rotation of wheels and a time of work-implementing travel is obtained with repletion of straight traveling and turning traveling, an error will occur due to slippage in the wheels. In particular, in the case of a turning traveling for a small turning radius, significant slippage occurs to result in no correspondence between a rotational speed of wheels and a moving distance, thus providing significant error. As such errors will be accumulated, accurate calculation of a progress degree at the latter half of the work becomes difficult.

In view of the above-described state of the art, there is a need for a technique that allows accurate traveling time management in a work site traveling.

Solution

A work vehicle according to the present invention comprises:
a vehicle body mounting a traveling mechanism;
an implement mounted on the vehicle body and configured to effect a ground work on a work site;
a satellite positioning module for outputting positioning data;
a traveling distance calculation section for calculating a traveling distance of the vehicle body based on the positioning data;
a traveling time calculation section for calculating an actual distance traveling time from a time required for traveling of traveling distance calculated by the traveling distance calculation section; and
a work management section for managing the ground work based on the actual distance traveling time.

With the above-described configuration, a moving distance (a traveling distance) of the vehicle body is obtained from coordinates positions of the vehicle body that are sequentially calculated from positioning data of the satellite positioning module and a time required for that moving (traveling) is calculated as an actual distance traveling time. Therefore, this actual distance traveling time can be obtained as a traveling time from which error in traveling distance due to slippage or the like has been eliminated. When a working situation of the work vehicle is to be managed by time, an accurate traveling time for the traveling distance is needed. So, with traveling time management using such actual distance traveling time, the working situation of the work vehicle can be grasped accurately. In particular, with a ground work vehicle such as a tractor, a rice planter, a work is often effected while traveling at a constant speed by providing the traveling mechanism with a constant vehicle speed instruction. And, in such constant-speed work-implementing travel, with management of the actual distance traveling time alone, the situation of the ground work (whether it is appropriate or inappropriate) can be grasped accurately.

Further, according to one preferred embodiment of the present invention:
there is provided a target traveling time setting section for setting a target traveling time for the ground work on the work site; and
the work management section is configured to calculate a progress degree of the ground work by comparing the target traveling time and the actual distance traveling time with each other.

In case a particular ground work is to be effected on a particular work site, an appropriate work time therefor can be calculated. Therefore, with the above-described arrangement, such appropriate work time will be set as the target traveling time. During a work, as the actual distance traveling times calculated sequentially are compared respectively with the target traveling time, a progress degree of the work indicative of to what degree of the entire work has been completed or what degree of work is remaining undone will be calculated. With this, time management of ground work by the work vehicle is realized.

According to one preferred embodiment, the progress degree can be informed in the course of traveling.

With the above arrangement, a driver or an operator can grasp a progress degree at a desired timing during a work-implementing travel, so that it is possible to determine future work-implementing travel (e.g. whether the work can be completed by the sunset or not, whether the amount of fuel will be sufficient until completion of the work, etc.).

In such time management, if there is produced a large difference between the set target traveling time and the sequentially calculated actual distance traveling time, it is assumed that the work is not being effected appropriately. In such case, it will be desired to temporarily stop the currently effected work. For this reason, according to one preferred embodiment, an emergency stop command is outputted if a time difference between the target traveling time and the actual distance traveling time exceeds a predetermined time.

In the case of an agricultural work vehicle that effects a cultivation work, a seedling planting work, a harvesting work in a work site which is referred to as a "field (agricultural field)", the agricultural work for the whole field will be completed by effecting straight traveling and turning traveling (90 degree turn, 180 degrees turn, etc.) in repetition. In this, the agricultural work will be effected in the straight traveling, whereas no agricultural work will be effected in the turning traveling. For this reason, time management with distinction between the straight traveling and the turning traveling is important. For instance, if a large difference of time occurs between the target traveling time and the actual distance traveling time, poor ground work result should be taken into consideration. Further, if a large difference of time occurs between the target traveling time and the actual distance traveling time during turning traveling, this should be regarded as occurrence of some ground surface condition making turning traveling difficult or the currently implemented turning radius being inappropriate, etc. For this reason, according to one preferred embodiment of the present invention, the work management section is configured to calculate a straight traveling time difference between the target traveling time and the actual distance traveling time at the time of straight traveling and a turning traveling time difference between the target traveling time and the actual distance traveling time at the time of turning traveling.

Time difference between the target traveling time and the actual distance traveling time occurs to due slippage between the ground surface and the traveling mechanism (wheels, etc.). Thus, by obtaining a slip ratio, it is possible to evaluate whether the vehicle speed, work load of the implement, the condition of the ground surface (field surface) are appropriate or not. For this reason, according to one preferred embodiment of the present invention, there is provided a slip ratio calculation section for calculating a slip ratio of the vehicle body, based on a time difference between the target traveling time and the actual distance traveling time.

Regarding this slip ratio too, slip situations differ between straight traveling and turning traveling. Thus, like the arrangement described above, it will be advantageous to effect the calculation with distinction between straight traveling and turning traveling. For this reason, according to one preferred embodiment of the present invention, the slip ratio calculation section is configured to calculate, from the time difference between the target traveling time and the actual distance traveling time, a straight traveling slip ratio which is a slip ratio at the time of straight traveling and a turning traveling slip ratio which is a slip ratio at the time of turning traveling.

According to one preferred embodiment of the present invention:

the work vehicle further comprises:

a recording section for recording management information managed by the work management section with allowing data transmission of the management information therefrom; and an informing section for informing the management information.

The management information includes the progress degree, the time difference, the slip ratio described above, etc. Then, if such management information as above are recorded in the recording section over time, such information can be linked with traveling locus of the work vehicle, thereby allowing more detailed work evaluation. Moreover, if such management information are forwarded to a management computer installed at a management center for managing ground works at various work sites, analysis of ground work using vast amount of data is made possible. Furthermore, if such management information are informed to e.g. a driver of the work vehicle or an operator who operates the work vehicle remotely, there can be provided an opportunity for improving the quality of work.

In the case of an automatic traveling that does not allow change of work based on driver's intuition or experience, such time-based work management described above will be particularly suitable. For realizing automatic traveling of the work vehicle, there are provided a route setting section for setting a target traveling route of the vehicle body in the work site; and an automatic traveling control section for generating an automatic traveling command for causing the vehicle body to travel automatically based on the target traveling route and the positioning data.

Further, the present invention is inclusive also of the above-described time-based management system for the work vehicle by itself, which is built in this work vehicle. Namely, an inventive time-based management system for a work vehicle mounting an implement for effecting a ground work mounted on a vehicle body that mounts a traveling mechanism, comprises:

a route setting section for setting a target traveling route for a work-implementing travel by the work vehicle;

a target traveling time setting section for assigning a target traveling time for each one of a plurality of work-implementing travel points set along the target traveling route;

a traveling time calculation section for calculating a lapsed time at each work-implementing travel point at time of actual work-implementing travel of the work vehicle as an actual traveling time; and a work management section for effecting comparative evaluation (difference value calculation) between the target traveling time and the actual traveling time at the work-implementing travel point.

And, in such time-based management system too, it will be advantageous if a work-implementing travel abnormality (an alarm) is informed when a difference value indicative of the difference between the target traveling time and the actual traveling time exceeds a predetermined threshold value. More preferably, the time-based management system further comprises:

a slip ratio calculation section for calculating a slip ratio of the vehicle body; and the system evaluates influence of the slip ratio on the difference if the difference value indicative of the difference between the target traveling time and the actual traveling time exceeds the predetermined threshold value.

Such time-based management system too can achieve the same advantageous effect/functions as those of the work vehicle described above and the system can also incorporate any one or more of the arrangements of the various embodiments described above.

BRIEF DESCRIPTION OF THE DRAWINGS

FIG. 1 is an explanatory view schematically illustrating a basic principle relating to a time management of a ground work by a work vehicle, FIG. 2 is an explanatory view schematically showing traveling times, traveling positions and a traveling locus of the work vehicle, FIG. 3 is a side view of a tractor showing one embodiment of the work vehicle, FIG. 4 is a functional block diagram showing a control system of the tractor.

EMBODIMENTS

Figure 5:
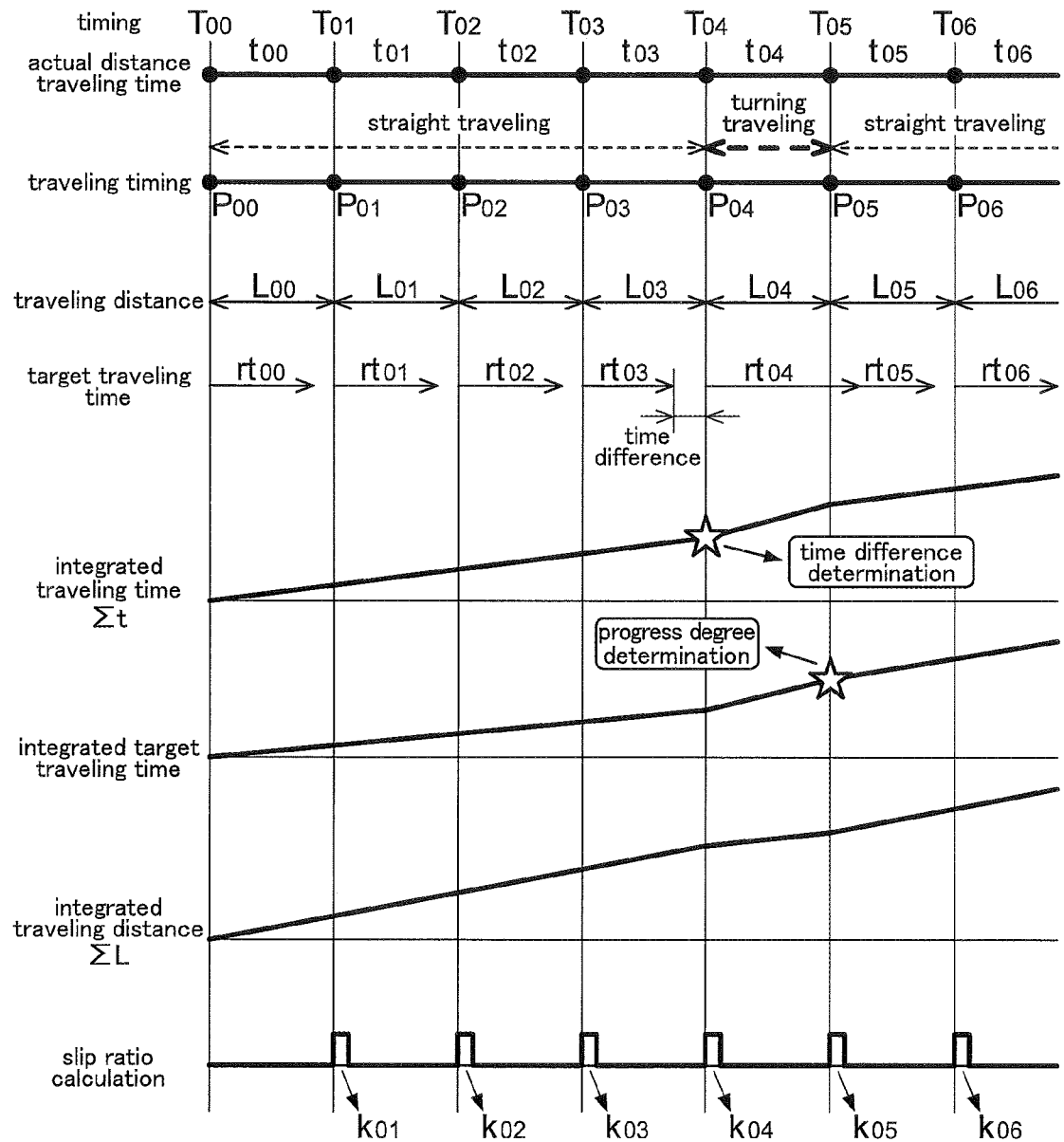
FIG. 5 is an explanatory view showing one example of data group chronologically processed at time of traveling of the work vehicle.

Before a specific embodiment of a work vehicle according to the present invention is explained, a basic principle relating to time management of a ground work by the work vehicle will be explained with reference to FIG. 1 and FIG. 2. FIG. 1 shows flow of data in the work vehicle engaged in a ground work. FIG. 2 schematically shows a traveling route and traveling times of the work vehicle.

Here, the work vehicle, as shown in FIG. 2, includes a vehicle body 1 mounting a traveling mechanism 10 constituted of steering wheels, drive wheels, etc., and an implement 30 attached to the vehicle body 1. In the example shown in FIG. 2, the work vehicle will effect a work-implementing travel in an entire work site by effecting straight traveling and 180 degrees turning traveling in repetition. The work vehicle includes a satellite positioning module 80 constituted of e.g. a GNSS module. The satellite positioning module 80 outputs positioning data indicative of coordinates positions (to be referred to "self-vehicle positions" hereinafter) of the vehicle body 1. Incidentally, such self-vehicle positions represented by the positioning data will be based on positions of an antenna. But, here, a position adjustment processing will be effected such that the self-vehicle positions will not be antenna positions, but may be appropriate positions of the vehicles (e.g. ground working points of the implement 30).

As shown schematically in FIG. 2, based on positioning data acquired by the satellite positioning module 80, a traveling distance calculation section 51 calculates traveling distances (denoted by L01 . . . in FIG. 2) from the self-vehicle positions (or traveling timings) (denoted by P01 . . . in FIG. 2) periodically obtained. If these self-vehicle positions periodically obtained are connected in the order of their acquisitions, a traveling locus of the work vehicle can be obtained. Further, by integration of the traveling distances, there can be obtained a traveling distance between predetermined traveling sections, e.g. a traveling distance of the entire route. Further, a traveling time calculation section 52 calculates times (denoted by t01 . . . in FIG. 2) required respectively for traveling of the traveling distances calculated by the traveling distance calculation section 51 as actual distance traveling times. By integration of the actual distance traveling times, there can be obtained an actual distance traveling time between predetermined traveling sections (e.g. an actual distance traveling time of the entire route). A work management section 50 uses these actual distance traveling times for time management of the ground work by this work vehicle.

This work vehicle further includes a target traveling time setting section 62. The target traveling time setting section 62 sets target traveling times needed when the vehicle effects a ground work while traveling in a work site at a predetermined vehicle speed (e.g. a constant vehicle speed of 5 km/h, 10 km/h, etc.). Such target traveling times can be set by the driver or can be automatically set by such means as communication. For instance, if this work vehicle is used as an automatic traveling work vehicle, the target traveling time setting section 62 can calculate target traveling times from a target traveling route set by the route setting section 61. Incidentally, vehicle speeds at time of straight traveling and vehicle speeds at turning traveling may not be same, but can be set independently of each other. Further alternatively, different vehicle speeds can be set for a predetermined section in both straight traveling and turning traveling.

In case a trouble occurs in traveling (malfunction in the traveling mechanism 10, slippage at a muddy spot, etc.) or in a work (generation of excessive load, etc.), a difference between the target traveling time at a predetermined self-vehicle position set by the target traveling time setting section 62 and an actual distance traveling time calculated by the traveling time calculation section 52 may become unexpectedly large. In such case, it is necessary to stop the work vehicle and to check the condition of the traveling mechanism 10 or the condition of the implement 30. Therefore, the work management section 50 has a function of outputting an emergency stop command if a time difference between the target traveling time and the actual distance traveling time exceeds a predetermined time. This function will be advantageous in particular when the work vehicle is implemented as an automatic traveling work vehicle.

In the example shown in FIG. 1, the work management section 50 includes a progress degree calculation section 501 and a slip ratio calculation section 502. The progress degree calculation section 501 calculates a progress degree of ground work by comparing the target traveling time set for the work for this work site and the actual distance traveling time calculated by the traveling time calculation section 52 (more particularly, an integrated value of actual distance traveling time for each predetermined section). And, the calculated progress degree can be informed via visual or auditory means. By this informing of progress degree, it becomes easy to grasp a progress degree of work (work efficiency), a remaining time of the work (an expected work completion time), etc. The slip ratio calculation section 502 calculates a slip ratio of the vehicle body 1, based on the time difference between the target traveling time at a predetermined self vehicle position and the actual distance traveling time. Slippage occurring during traveling on a muddy ground surface or turning traveling by a small turning radius will appear as a time difference between target traveling time travelled in constant-speed and the actual distance traveling time. So, from this time difference, a slip ratio can be calculated. Based on this slip ratio, ground surface condition of the work site, the turning condition, etc. can be evaluated.

In case a work is effected on a work site by repeating straight traveling and turning traveling like this work vehicle, in many cases, the implement 30 is driven in straight traveling and the implement 30 is not driven in turning traveling. Also, situations of the traveling mechanism 10 significantly differs between straight traveling and turning traveling. Thus, it will be advantageous to effect traveling management or work management with distinction between straight traveling and turning traveling. For this reason, the work management section 50 has a function of calculating a time difference during straight traveling as a straight traveling time difference and calculating a time difference during turning traveling as a turning traveling time difference. In particular, traveling load significantly differs between straight traveling and turning traveling. Thus, it is important for slippage evaluation to effect the evaluation of slippage attributable to traveling load with distinction between straight traveling and turning traveling. For this reason, the slip ratio calculation section 502 can be configured to calculate a straight traveling slip ratio as a slip ratio at time of straight traveling from the straight traveling time difference and to calculate a turning traveling slip ratio as a slip ratio at time of turning traveling from the turning traveling time difference.

The work management section 50 can input also various kinds of data (e.g. traveling data indicative of the condition of the traveling mechanism 10 or work data indicative of the condition of the implement 30) other than those described above and record these data as management information. Also, data produced or managed by the work management section 50 such as the progress degree, the time difference, the slip ratio, the vehicle traveling locus, etc. are also recorded as the management information. Such recorded management information can be retrieved from the work vehicle via a recording media or data communication. Management information which should be informed urgently will be informed directly to the driver or the operator of the work vehicle via visual or auditory means.

The traveling control section 40 includes an automatic traveling control section 42. When this work vehicle is implemented as an automatic traveling work vehicle, the traveling control section 40 will generate an automatic traveling command for causing the vehicle body 1 to travel automatically such that its self vehicle positions will coincide with a target traveling route of the vehicle body 1 in a work site set by the route setting section 61.

Next, one specific embodiment of the work vehicle relating to the present invention will be explained. In the instant embodiment, the work vehicle, as shown in FIG. 3, is a tractor mounting the implement 30 such as a rotary cultivator for effecting an agricultural work, cultivation work etc., on a field (work site) delimited by ridges or the like. In this tractor, a maneuvering section 20 is provided at a center portion of the vehicle body 1 which is supported by front wheels 11 and rear wheels 12. At a rear portion of the vehicle body 1, there is mounted the implement 30 which is a rotary cultivator, via a hydraulic lift mechanism 31. The front wheels 11 function as steering wheels and by changing a steering angle thereof, a traveling direction of the tractor is changed. The steering angle of the front wheels 11 is changed by an operation of a steering mechanism 13. This steering mechanism 13 includes a steering motor 14 for automatic steering. At time of manual traveling, steering of the front wheels 11 can be made by operating a steering wheel 22. In a cabin 21 of the tractor, there is provided a satellite positioning module 80 constituted as a GNSS module. Though not shown, a satellite antenna for receiving GPS signals or GNSS signals is mounted to a ceiling area of the cabin 21. Incidentally, the satellite positioning module 80 can include an inertial navigation module incorporating a gyro acceleration sensor, a geomagnetic direction sensor, etc. in order to assist the satellite navigation. Needless to say, the inertial navigation module can be provided at a site different from the satellite positioning module 80.

FIG. 4 shows a control system built in this tractor. This control system employs the basic principle which was explained above with reference to FIG. 1. A control unit 4 which is the core component of this control system includes an output processing section 7, an input processing section 8 and a communication processing section 70, which function as input/output interfaces. The output processing section 7 is connected to a vehicle traveling device group 71, an implement device group 72, an informing device 73, etc. Though not shown, the vehicle traveling device group 71 includes, in addition to the steering motor 14, devices controlled for vehicle traveling such as a speed changer mechanism, an engine unit, etc. The implement device group 72 includes a driving mechanism for the implement 30, the lift mechanism 31 for lifting up/down the implement 30, etc. The communication processing section 70 has functions of transmitting data processed by the control unit 4 to a management computer 100 built at the remote management center and receiving various data from the management computer 100. The informing device 73 includes a flat display panel, a lamp, a buzzer and informs a driver or an operator of various kinds of information desired to be informed to the driver or operator such as a traveling alarm, a deviation from target in an automatic steering traveling, in visual or audible form. Signal transmission between the informing device 73 and the output processing section 7 is effected in either wired or wireless manner.

The input processing section 8 is connected to the satellite positioning module 80, a traveling system detection sensor group 81, an implement system detection sensor group 82, an automatic/manual switching operation tool 83, etc. The traveling system detection sensor group 81 includes sensors for detecting traveling states such as an engine rotational speed, a speed change state, and so on. The implement system detection sensor group 82 includes sensors for detecting a position or a tilting of the implement 30, a senor for detecting work load, etc. The automatic/manual switching operation tool 83 is a switch for selecting either an automatic traveling mode for traveling by automatic steering and a manual steering mode for traveling by the manual steering. For instance, if the automatic/manual switching operation tool 83 is operated during traveling in the automatic steering mode, switchover is made to traveling by the manual steering. Conversely, if the automatic/manual switching operation tool 83 is operated during traveling in the manual steering mode, switchover is made to traveling by the automatic steering.

The control unit 4 incorporates those functional sections described above with reference to FIG. 1, namely, the traveling control section 40, the traveling distance calculation section 51, the traveling time calculation section 52 and the work management section 50. In order to control the implement 30, a work control section 54 is provided. This tractor is capable of traveling under both automatic traveling (automatic steering) and manual traveling (manual steering). Therefore, the traveling control section 40 includes a manual traveling control section 41 as well as the automatic traveling control section 42. In this automatic traveling, traveling is done along a preset target traveling route. So, the control unit 4 includes a route setting section 61 and a target traveling time setting section 62. The route setting section 61 sets a target traveling route and the target traveling time setting section 62 sets a target traveling time which is an appropriate time until traveling to a predetermined position on the set target traveling route.

Production of the target traveling route is done by the control unit 4 and/or the management computer 100. In case the generation of the target traveling route is done in the control unit 4, this control unit 4 will be equipped with a route generation section 63 having a route generation algorithm. Whereas, in case the generation of the target traveling route is done in the management computer 100, generated target traveling route will be sent from the management computer 100 to the control unit 4 and set by the route setting section 61. The automatic traveling control section 42 calculates any direction error and position error between the target traveling route and the self-vehicle position and generates an automatic steering instruction and outputs this to the steering motor 14 via the output processing section 7. Both the manual traveling control section 41 and the automatic traveling control section 42 together constituting the traveling control section 40 can provide a constant vehicle speed command to the traveling mechanism 10 for traveling at a constant vehicle speed. With this, in either the automatic traveling or the manual traveling, a constant speed vehicle traveling for traveling with automatically maintaining a constant vehicle speed (or, a different vehicle speed may be employed for straight traveling and turning traveling) is possible.

In this embodiment too, the work management section 50 is provided with the progress degree calculation section 501 and the slip ratio calculation section 502 which were described above with reference to FIG. 1. The data inputted to the control unit 4 or the data produced in the control unit 4 will be recorded in the recording section 55, so that designated data in the recorded data will be forwarded to the management computer 100 by a real-time processing or a batch processing.

The control unit 4 further includes an informing section 56. In case various kinds of data handled by the work management section 50 (e.g. a progress degree, slip ratio, a direction or position deviation at time of automatic traveling, etc.) exceed a predetermined allowable range, the informing section 56 produces informing data for issuing an alarm via the informing device 73. Alternatively, the progress degree, etc. can also be informed via the informing device 73 in response to an operation of a button or the like.

An example of data group chronologically handled by the control unit 4 in association with tractor traveling are shown in a schematic timing chart shown in FIG. 5. Traveling route formed by connecting traveling positons is shown linearly, but this traveling route includes straight traveling paths and turning paths. Namely, in the example shown in FIG. 5, a section from traveling position: P00 to position: P04 is straight traveling, and a section from P04 to P05 is a turning starveling and from P05, straight traveling and turning traveling are repeated again.

In the case of the traveling example shown in FIG. 5, traveling positions which are self vehicle positions at predetermined timings (denoted by T00 . . . T06) are denoted by P00 . . . P06 and traveling distances as distances between the respective traveling positions are denoted by L00 . . . L06. As these traveling distances are calculated based on positioning data from the satellite positioning module 80, the traveling times needed for the respective traveling distances (denoted by t00 . . . t06) become "actual distance traveling times" from which traveling distance errors due to slippage or the like have been eliminated.

If target traveling times between respective traveling positions (denoted by rt00 . . . rt06) are set by the target traveling time setting section 62, time differences as differences between the target traveling times and the actual distance traveling times will be calculated. And, if such time difference exceeds an allowable range, informing of an alarm or stopping of the vehicle will be effected. Also, by integrating the actual distance traveling time from the start of the traveling, an integrated actual distance traveling time up to its timing can be calculated. If a time difference between the integrated actual distance traveling time obtained by the calculation and a target integrated actual distance traveling time exceeds an allowable range (timing: T04), informing of an alarm or stopping of the vehicle will be effected. Incidentally, in FIG. 5, the respective integrated actual distance traveling times are shown as a constant (same) length (a constant time). In actuality however, they will hardly be a constant (same) length.

If an actual traveling distance time exceeds a target traveling time, this can be interpreted as occurrence of slippage. Thus, a slip ratio (denoted by k01 . . . k05 in FIG. 5) will be calculated from the actual traveling distance time and the target traveling time and this ratio will be recorded. And, if this slip ratio exceeds a preset allowable range, an alarm will be informed. Needless to say, as such slip ratio can be calculated from an apparent traveling distance calculated from an axle rotational speed of the rear wheels 12 and a traveling distance calculated based on the positioning data, the slip ratio calculation section 502 can employ a slip ratio calculated by this method also.

Figure 6:
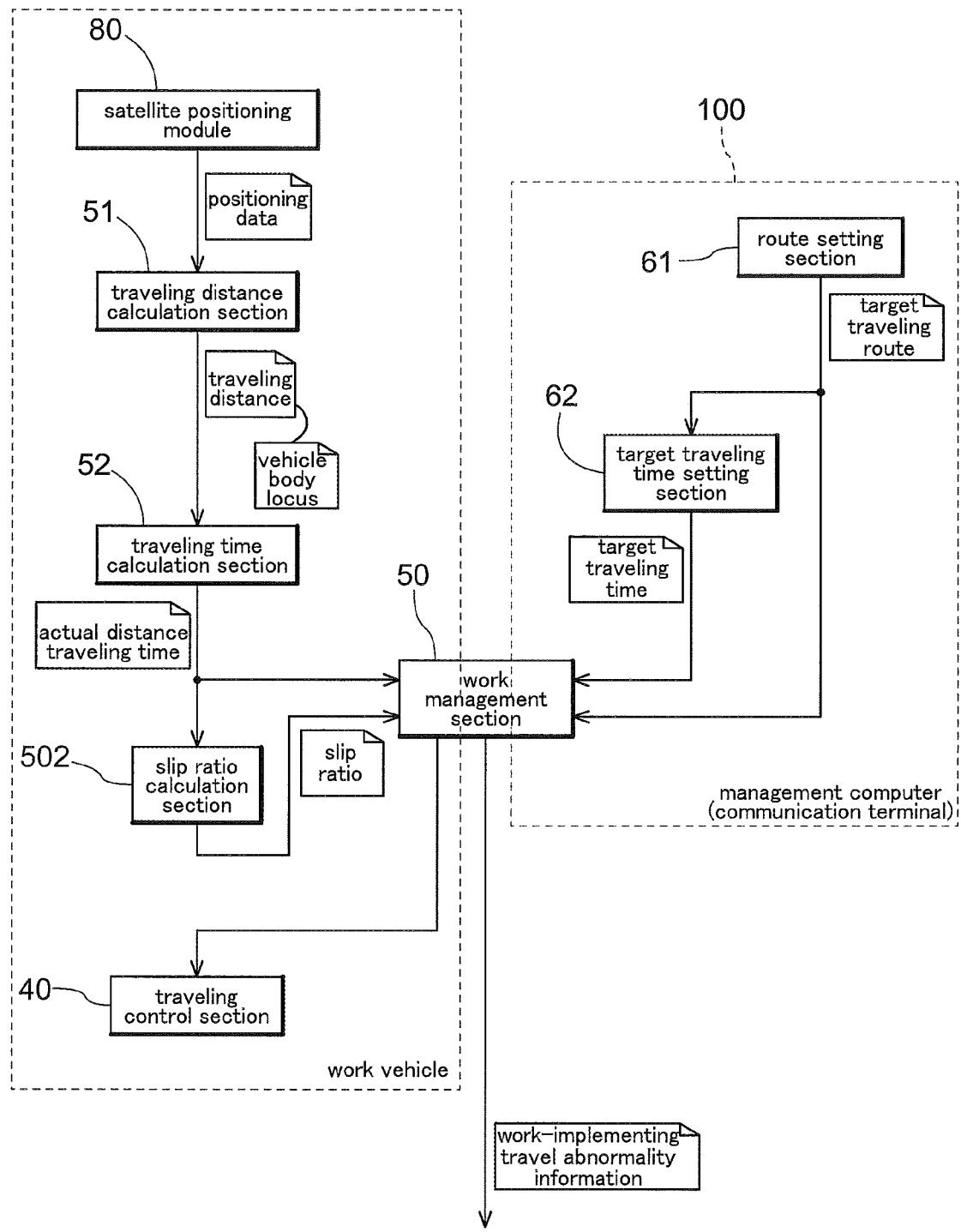
FIG. 6 is a functional block diagram showing a basic control configuration in the time-based management system.

Other Embodiments (1) In the foregoing embodiment, the functions of effecting traveling time management in a work site traveling was built substantially in the work vehicle. However, some of these functions can be provided in distribution to e.g. the management computer 100, in addition to the work vehicle. And, an example of such time based management system is illustrated in FIG. 6. In this system, the route setting section 61 for setting a target traveling route and the target traveling time setting section 62 are built in the management computer 100 of the management center or in a communication terminal of managing personnel, and a target traveling route and target traveling times will be forwarded to the work vehicle. The traveling time calculation section 52 for calculating an actual traveling time and the slip ratio calculation section 502 will be advantageously built in the work vehicle, for such reason as forwarding of data to be utilized. However, the work management section 50 can be built in whichever convenient one of the work vehicle, the management computer or the managing personnel's communication terminal. The work management section 50 effects comparison evaluation between a target traveling time and an actual traveling time and calculates a difference value indicative of a difference between the target traveling time and the actual traveling time. And, if this difference value exceeds a predetermined threshold value, the work management section 50 outputs a work-implementing travel abnormality information (alarm). Further, when needed, the work management section 50 can input a slip ratio calculated by the slip ratio calculation section 502 and evaluate influence of this slip ratio relative to such difference value.

(2) In the foregoing embodiment, as a work vehicle, there was cited a tractor mounting a rotary cultivator as the work implement 30. However, aside such tractor, the work vehicle can be embodied as other various kinds of work vehicles such as an agricultural vehicle such as a rice planter, a fertilizer, a combine, or a work vehicle such as a civil engineering vehicle having a dozer, a roller, etc. as the implement 30.

(3) The respective functional sections shown in the functional block diagrams shown in FIG. 1, FIG. 4 and FIG. 6 are sectioned for the sake of explanation, mainly. In actuality, however, the respective functional sections can be combined or can be further divided in sub sections, if necessary.

The present invention is applicable to a work vehicle that effects a ground work while traveling. In particular, the present invention is applicable preferably to an automatic traveling work vehicle that effects automatic traveling.

DESCRIPTION OF REFERENCE MARKS/NUMERALS

1: vehicle body
10: traveling mechanism
4: control unit
40: traveling control section
41: manual traveling control section
42: automatic traveling control section
50: work management section
501: progress degree calculation section
502: slip ratio calculation section
51: traveling distance calculation section
52: traveling time calculation section
54: work control section
55: recording section
56: informing section
61: route setting section
62: target traveling time setting section
63: route generation section
7: output processing section
70: communication processing section
73: informing device
8: input processing section
80: satellite positioning module

The invention claimed is:

1. A work vehicle comprising:
a vehicle body mounting a traveling mechanism;
an implement mounted on the vehicle body and configured to effect a ground work on a work site;
a satellite positioning module for outputting positioning data;
a traveling distance calculation section for calculating a traveling distance of the vehicle body based on the positioning data;
a traveling time calculation section for calculating an actual distance traveling time from a time required for traveling of traveling distance calculated by the traveling distance calculation section; and
a work management section for managing the ground work based on the actual distance traveling time,
wherein an emergency stop command is outputted if a difference between the target traveling time and the actual distance traveling time exceeds a predetermined time.

2. The work vehicle of claim 1, wherein:
there is provided a target traveling time setting section for setting a target traveling time for the ground work on the work site; and
the work management section is configured to calculate a progress degree of the ground work by comparing the target traveling time and the actual distance traveling time with each other.

3. The work vehicle of claim 2, wherein the progress degree can be informed in the course of traveling.

4. The work vehicle of claim 2, wherein the work management section is configured to calculate a straight traveling time difference between the target traveling time and the actual distance traveling time at the time of straight traveling and a turning traveling time difference between the target traveling time and the actual distance traveling time at the time of turning traveling.

5. The work vehicle of claim 2, further comprising a slip ratio calculation section for calculating a slip ratio of the vehicle body, based on a time difference between the target traveling time and the actual distance traveling time.

6. The work vehicle of claim 5, wherein the slip ratio calculation section is configured to calculate, from the time difference between the target traveling time and the actual distance traveling time, a straight traveling slip ratio which is a slip ratio at the time of straight traveling and a turning traveling slip ratio which is a slip ratio at the time of turning traveling.

7. The work vehicle of claim 1, further comprising:
a recording section for recording management information managed by the work management section with allowing data transmission of the management information therefrom; and
an informing section for informing the management information.

8. The work vehicle of claim 1, further comprising:
a route setting section for setting a target traveling route of the vehicle body in the work site; and
an automatic traveling control section for generating an automatic traveling command for causing the vehicle body to travel automatically based on the target traveling route and the positioning data.

9. A time-based management system for a work vehicle mounting an implement for effecting a ground work mounted on a vehicle body that mounts a traveling mechanism, comprising:
a route setting section for setting a target traveling route for a work-implementing travel by the work vehicle;
a target traveling time setting section for assigning a target traveling time for each one of a plurality of work-implementing travel points set along the target traveling route;
a traveling time calculation section for calculating a lapsed time at each work-implementing travel point at time of actual work-implementing travel of the work vehicle as an actual traveling time; and
a work management section for effecting comparative evaluation between the target traveling time and the actual traveling time at the work-implementing travel point,
wherein a work-implementing travel abnormality is informed when a difference value indicative of the difference between the target traveling time and the actual traveling time exceeds a predetermined threshold value.

10. The time-based management system of claim 9, wherein:
the system further comprises a slip ratio calculation section for calculating a slip ratio of the vehicle body; and
the system evaluates influence of the slip ratio on the difference if the difference value indicative of the difference between the target traveling time and the actual traveling time exceeds the predetermined threshold value.

* * * * *